(12) United States Patent
Smoot et al.

(10) Patent No.: US 9,778,741 B2
(45) Date of Patent: *Oct. 3, 2017

(54) SYSTEM AND METHOD FOR PROVIDING A THREE DIMENSIONAL (3D) IMMERSIVE ARTISTIC EXPERIENCE AND INTERACTIVE DRAWING ENVIRONMENT

(71) Applicant: DISNEY ENTERPRISES, INC., Burbank, CA (US)

(72) Inventors: Lanny S. Smoot, Thousand Oaks, CA (US); Quinn Y. Smithwick, Pasadena, CA (US); Daniel Reetz, North Hollywood, CA (US); Michael J. Ilardi, Los Angeles, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 194 days.

This patent is subject to a terminal disclaimer.

(21) Appl. No.: 14/710,683

(22) Filed: May 13, 2015

(65) Prior Publication Data

US 2015/0241960 A1 Aug. 27, 2015

Related U.S. Application Data

(63) Continuation of application No. 13/174,920, filed on Jul. 1, 2011, now Pat. No. 9,082,214.

(51) Int. Cl.
*G06F 3/00* (2006.01)
*G06F 3/01* (2006.01)
(Continued)

(52) U.S. Cl.
CPC .............. *G06F 3/011* (2013.01); *G06F 3/017* (2013.01); *G06T 19/006* (2013.01); *G06T 19/20* (2013.01);
(Continued)

(58) Field of Classification Search
CPC .................. G06T 19/006; G06T 19/20; G06T 2219/2016; G06T 19/00; G06F 3/011;
(Continued)

(56) References Cited

U.S. PATENT DOCUMENTS 6,091,422 A * 7/2000 Ouaknine ............... G06T 15/00
345/419
7,434,153 B2 * 10/2008 Liu ........................ G06F 3/0481
715/200

(Continued)

*Primary Examiner* — Frank Huang
(74) *Attorney, Agent, or Firm* — Marsh Fischmann & Breyfogle LLP; Kent A. Lembke

(57) ABSTRACT

A method for providing a three dimensional (3D) drawing experience. The method includes capturing a 3D image of a participant and then processing this image to key the participant's image from a background. The keyed participant's image is mixed with a 3D background image such as frames or scenes from a 3D movie, and the mixed 3D image is projected on a projection screen. For example, left and right eye images may be projected from a pair of projectors with polarization films over the lenses, and the projection screen may be a polarization-maintaining surface such as a silver screen. The user moves a drawing instrument in space in front of the projection screen, and spatial tracking performed to generate a locus of 3D positions. These 3D positions are used to create a 3D drawing image that is projected with the 3D background and participant images in real time.

18 Claims, 6 Drawing Sheets

(51) Int. Cl.
*G06T 19/00* (2011.01)
*G06T 19/20* (2011.01)
*H04N 13/00* (2006.01)
*H04N 13/04* (2006.01)

(52) U.S. Cl.
CPC ....... *H04N 13/004* (2013.01); *H04N 13/0459* (2013.01); *H04N 13/0468* (2013.01); *G06T 2219/2016* (2013.01)

(58) Field of Classification Search
CPC ......... G06F 3/017; G06F 3/01; H04N 13/004; H04N 13/0459; H04N 13/0468; H04N 13/00
USPC .......................................................... 348/43
See application file for complete search history.

(56) References Cited

U.S. PATENT DOCUMENTS

| | | | |
|---|---|---|---|
| 2003/0033150 A1* | 2/2003 | Balan | G10L 15/22 704/275 |
| 2004/0039704 A1* | 2/2004 | Gilliam | H04L 63/0807 705/50 |
| 2004/0135780 A1* | 7/2004 | Nims | H04N 13/026 345/419 |
| 2005/0046702 A1* | 3/2005 | Katayama | G06T 15/205 348/222.1 |
| 2005/0089214 A1* | 4/2005 | Rubbert | A61C 7/00 382/154 |
| 2005/0134683 A1* | 6/2005 | Quintana | H04N 7/185 348/61 |
| 2006/0084039 A1* | 4/2006 | Ryokai | B44D 3/00 434/155 |
| 2008/0267290 A1* | 10/2008 | Barbieri | H04N 19/593 375/240.13 |
| 2010/0295960 A1* | 11/2010 | Furlan | H01R 13/6683 348/222.1 |
| 2010/0309288 A1* | 12/2010 | Stettner | G01S 17/023 348/43 |
| 2010/0319235 A1* | 12/2010 | Panaro | A01K 97/00 43/26.1 |
| 2011/0032483 A1* | 2/2011 | Hruska | G02B 26/008 353/8 |
| 2011/0169778 A1* | 7/2011 | Nungester | G06F 3/03542 345/175 |
| 2012/0019659 A1* | 1/2012 | Warzelhan | H04N 7/18 348/143 |
| 2012/0019703 A1* | 1/2012 | Thorn | G06T 5/002 348/333.03 |
| 2012/0062560 A1* | 3/2012 | Swoboda | H04N 13/0402 345/419 |
| 2012/0113228 A1* | 5/2012 | Konno | H04N 13/0239 348/47 |
| 2012/0287241 A1* | 11/2012 | Foord | H04N 21/2187 348/46 |

* cited by examiner

SYSTEM AND METHOD FOR PROVIDING A THREE DIMENSIONAL (3D) IMMERSIVE ARTISTIC EXPERIENCE AND INTERACTIVE DRAWING ENVIRONMENT

CROSS-REFERENCE TO RELATED APPLICATIONS

This application is a continuation of U.S. patent application Ser. No. 13/174,920, which was filed on Jul. 1, 2011, which is hereby incorporated by reference in its entirety.

BACKGROUND

1. Field of the Description

The present description relates, in general, to interactive three dimensional (3D) systems and devices, and, more particularly, to a system and method for providing a 3D immersive and interactive drawing environment.

2. Relevant Background

Operators of destination facilities, such as amusement parks, shopping malls, concert and athletic event venues, and the like, are continuously searching for ways to attract more visitors and to enhance each visitor's enjoyment while at their destination. To this end, many destinations have added more and more opportunities to offer personalized and unique experiences to their visitors to draw the visitors to their facilities for first and repeat visits.

For example, an amusement park may include many booths or attractions that entertain visitors through interactive experiences. A visitor may have their picture taken and then be allowed to manipulate the captured image to superimpose it upon a movie character's body or to morph themselves into their favorite animal. In another example, a visitor's identity may be determined and their name or their personal information, such as their birthday or hometown, may be used to personalize their experience, e.g., while in a ride line, the visitor may have their name called out or have a character wish them "Happy Birthday!" The goal of these attractions is to provide a memorable experience to the visitor that causes them to feel special or unique and also to allow them to interact or participate in the environment as such interaction is often more entertaining than passive activities.

With advances in technology, it is becoming more and more common to provide multi-dimensional shows and interactive activities to entertain visitors of an amusement park or other facility. For example, visitors may wear special glasses to be allowed to view a 3D movie and additional senses or dimensions may be added by causing their seats to move, by providing wind, by changing temperatures of the display area, and/or by spraying water or providing scents. In other cases, a 3D gaming experience may be provided with a stereoscopic video game that uses technology to create the illusion of depth in an image and allowing the game player to interact or control the game simply by moving in a game area with or without handheld controllers.

3D technology presents opportunities for the operators of amusement parks and other destination facilities to enhance the entertainment that they provide their many visitors. However, 3D video games are becoming common in home game systems, and 3D television sets are also now available for purchase by the general public. As a result, visitors of amusement parks and other facilities demand a different and more unique 3D experience to draw and retain their attention. Hence, there remains a need for 3D entertainment systems and methods that provide more personalized and immersive experiences for their users.

SUMMARY

The present invention addresses the above problems by providing a 3D drawing system (and corresponding method for providing 3D drawing experience) that is adapted to provide a personalized and immersive experience while also providing real time (or near real time) feedback to the "artist" or user of the system.

The inventors were attempting to create an entertaining and interactive experience that built upon a movie that featured motorized vehicles that had illuminated features and left light or glowing trails or jet walls. It was recognized that prior techniques failed to provide real time feedback to visitors and were difficult to personalize. For example, light painting systems have been designed in which a shutter of a digital or film camera is left open in a dark room, and a person moves a wand with a light at its tip through a space targeted by the camera. A lighted trail of the wand tip's positions over time then is visible in the photographic image produced by the camera. This fails to provide real time feedback to the "artist" or person moving the wand as the wand's trail is only visible later in the produced photograph, which is viewed after the act of moving the wand. The sustained trail itself is not visible to the person during the drawing of the path and is only revealed after the experience is over. Also, light painting provides no depth as the images including the wand's trail are limited to a two-dimensional or planar photograph.

In contrast, the 3D drawing system described herein is adapted with features and functionality such that it provides an immersive and interactive drawing environment that provides real time feedback to the artist. Briefly, the 3D drawing system tracks a wand tip using 3D techniques, such as by using stereo cameras or magnetic sensors, to capture the instantaneous locus of points of the wand tip on a 3D projection. The artist moving the wand tip is positioned near a projection surface of a stereo projection screen and, in some cases, is wearing 3D glasses. The captured wand tip points in 3D space are displayed, such as with a pair of projectors providing left and right eye images, nearly simultaneously with their capture on the projection surface immediately in front of the artist or system user. Thus, the artist is able to move the wand tip to create and leave a "frozen" or persistent trail in volumetric space as they move the wand, e.g., "persistent" in the fact that the entire set (or a portion of such set) of wand tip points or 3D locations is typically displayed on an ongoing basis to allow the artist to draw a 3D image of an object. The effect causes the person moving the wand to appear to be drawing lighted, floating images in free space in real time and right in front of their eyes to provide a new and unique interactive 3D experience.

To enhance the entertainment value, the 3D drawing system includes an image capture stage or assembly. Thus, during operation of the 3D drawing system, a preliminary step is performed to capture a 3D image of the user or artist before the drawing session begins. The 3D image is then processed so as to place the captured image of the artist into a 3D environment (or 3D image stream) that is projected with the captured wand tip locations on the 3D projection screen. Continuing the non-limiting example of illuminated vehicles leaving light trails, an artist or user may have their image captured in a position similar to that of riding or driving one of the vehicles, and this captured image may be processed such as with chromakey compositing (sometimes called chromakeying, color keying, color-separation overlay, greenscreen, bluescreen, or the like) or with other techniques. Then, the 3D chromakeyed image of the artist or user is placed in a 3D backdrop such as one from a movie in which the vehicles were included for the movie characters.

For example, left and right 3D images of the artist may be superimposed or mixed with left and right 3D images from a movie scene to place the artist in the 3D movie world, but their vehicle may be removed or missing such that they have to draw their own vehicle in the immersive and interactive 3D drawing space in front of the 3D projection screen. In this manner, the 3D drawing system may be operated to allow a user or artist to draw 3D images that encircle, appear to support, or in other ways augment their own captured 3D image within a 3D world. The 3D drawing system is able to personalize the light drawing experience while providing an interesting and entertaining 3D interactive environment with real time and persistent feedback to the user or artist.

More particularly, a method is provided for creating a unique and immersive 3D drawing experience for a user. The method may be implemented through the use of a controller (e.g., a computer system running one or more software packages or coded routines) communicating with a number of peripheral devices such as a pair of image capturing cameras, stereo projectors projecting 3D images onto a projection screen, and a tracking mechanism useful for determining X, Y, and Z locations of a drawing instrument (e.g., a tip of a wand).

The method may begin with, in response to first signals from a controller, projecting a 3D image of the user on a projection screen. Then, with a position tracking mechanism, the method may continue with determining 3D positions of a drawing instrument positionable by the user during a drawing time period (e.g., the user may move the drawing instrument in 3D space in front of the projection screen to perform 3D drawing). The set or locus of determined 3D positions is stored in memory that is accessible by a controller. Then, with the controller, the method continues with generating a 3D drawing image based on the set of determined 3D positions. The immersive experience is then created by the method continuing in response to second signals from the controller with projecting a mixed 3D image that includes a blending or mix of the projected 3D image of the user and the 3D drawing image (e.g., the 3D user image can be keyed into the 3D background images). Preferably, the projecting of the mixed 3D image is performed substantially concurrently with the tracking of the 3D positions of the drawing instrument to provide the user with real time feedback of the results of their drawing efforts (moving the drawing instrument in 3D space, which to the user appears to be positioning of it in 3D space about the projected image of themselves).

In some embodiments, the step of determining of 3D positions is performed only after the controller receives a start drawing signal from the drawing instrument and is terminated after the controller receives a stop drawing signal from the drawing instrument, whereby the user selectively starts and stops 3D drawing with the drawing instrument. In some cases, the method further includes capturing the 3D image of the user, and the projected 3D image of the user is mixed with a 3D background image. Such image capture may include capturing a left eye image with a first camera and a right eye image with a second camera spaced apart from the first camera by an interocular distance and further includes processing the left and right eye images to key out an image of the user from background images.

In some implementations of the method, the step of projecting the 3D image of the user mixed with the 3D background image includes projecting with a first projector the processed left eye images with left eye images of the 3D background image and concurrently projecting with a second projector the processed right eye images with right eye images of the 3D background image. In such implementations, the 3D drawing image may be processed to include left and right images mapped to the right and left eye images of the 3D image of the user. Such special mapping allows portions of the 3D drawing image behind the 3D image of the user to be occluded from view by the user.

Further, the first projector may project light with a first polarization and the second projector may project light with a second polarization differing from the first polarization, and the projection screen may include a metalized or silver or other polarization-maintaining surface. The method may also include, after the projecting of the mixed 3D image, the step of modifying the projected mixed 3D image to remove the 3D image of the user, whereby a completed version of a 3D drawing is projected on the projection screen. Further, the special effects or manipulation of the completed 3D drawing may be provided. For example, the method may include, after the modifying of the projected mixed 3D image, animating the 3D drawing image on the projection screen such as by rotating the 3D drawing image on the projection screen to modify a point of view for the user, whereby the 3D drawing image is rotated in 3D space (e.g., to spin the 3D drawing out of the 3D background at the end of a drawing session).

DETAILED DESCRIPTION

Figure 1:
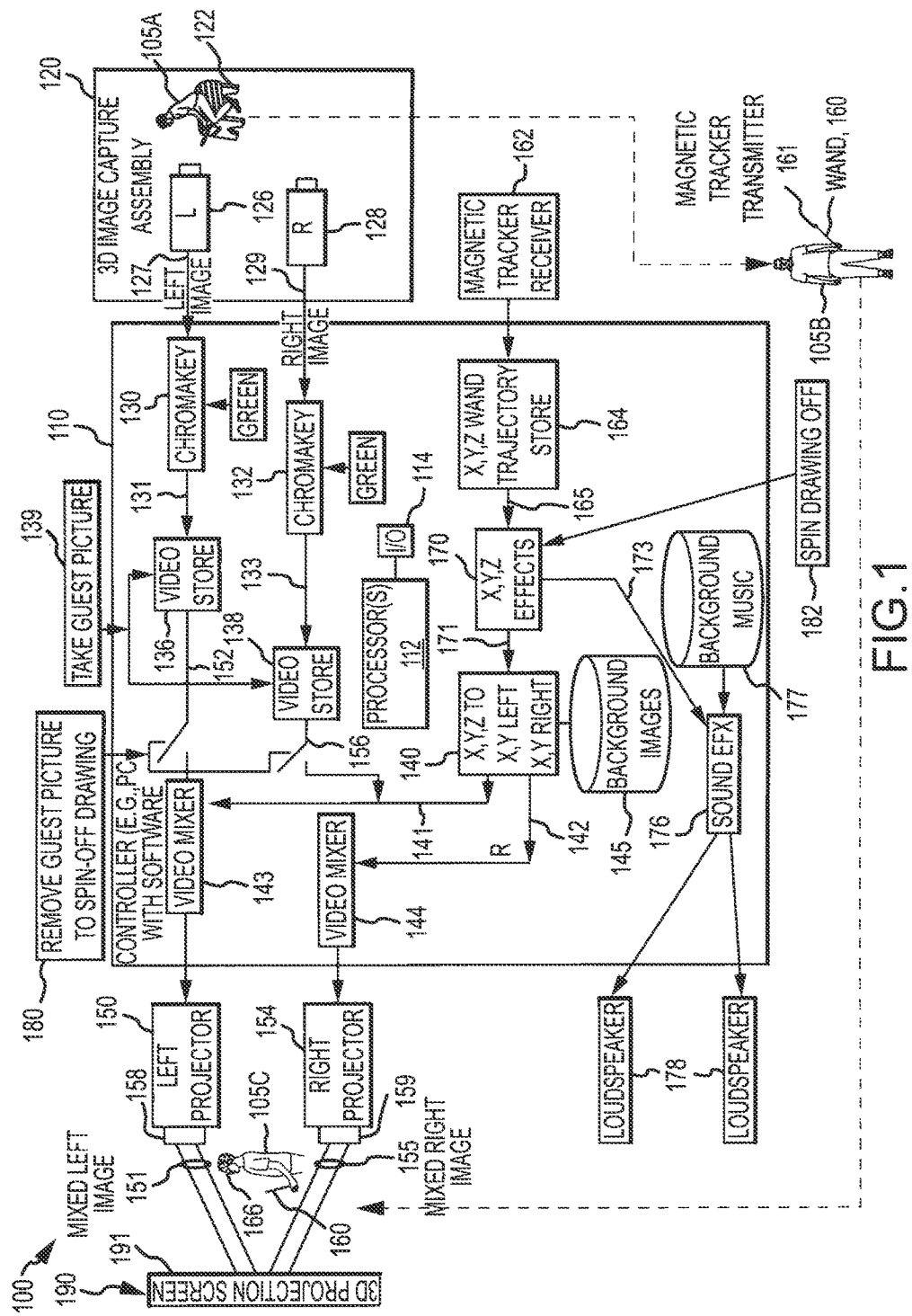
FIG. 1 is a functional block drawing of a 3D drawing system according to one embodiment of the invention illustrating logically components of the system and their functionality to provide an immersive 3D drawing environment.

The following description is directed to systems and methods for providing users or "artists" with an immersive 3D drawing experience. The description begins with a discussion of a functional block diagram of an exemplary 3D drawing system with reference to FIG. 1 and then proceeds to a discussion of perspective views of one implemented 3D drawing system during use by an artist or user.

As will become clear from this description, a 3D drawing system is described that functions to capture still or video 3D images of an artist and then projects these captured images along with a 3D background image stream so as to "place" an image of the artist within a 3D workspace or drawing volume. The artist wears 3D or special glasses to view this projected 3D image, and the artist is provided a drawing instrument (or "wand") with a tracking element (such as a magnetic tracker transmitter on its tip). The artist's movement of the drawing instrument is tracked by a tracker receiver of the 3D drawing system to collect a set of 3D positions of the tracking element.

The 3D drawing system operates to add a display of these tracked/collected 3D positions within the projected 3D image streams that contain the captured 3D artist image and the 3D background images (e.g., using a pair of cameras outputting left and right eye image streams that can be perceived by the artist's left and right eyes, respectively). In this manner, the artist can see in real time and in 3D an object(s) they have drawn about (or relative to) their captured 3D image and within the stream of 3D background images (e.g., draw a horse they are riding in the back drop of an animated film, draw a car they are driving in a street scene of a movie, draw an illuminated motorcycle with a movie set in the background, and so on). Special effects may be applied to animate the artist's captured image, e.g., beam them into (or insert them into) the 3D background to initiate drawing by the artist and beam them back out (or remove them) from the 3D background to end drawing phases and/or the image they have just created (e.g., remove the image of the artist and then animate the created 3D object such as by causing it to drive off the set or be "spun" out of the 3D background imagery).

FIG. 1 illustrates a functional block diagram of an exemplary 3D drawing system 100 that may be used to provide an immersive drawing experience to a user or "artist." The 3D drawing system 100 includes a controller or control system 110 that is configured to store and process digital images used to form projected 3D images (image streams 151, 155) to create a 3D drawing effect, to process and mix such images (e.g., to perform chromakey compositing of the captured 3D image of the artist and to insert this image onto/into the left/right background images), to track 3D locations of a drawing instrument or "wand" 160 and use such tracking information to generate a 3D image of the locus of the wand or wand tip positions for projection, and provide special effects such as beaming an image of the artist in and out of the projected image or to spin out or otherwise animate the drawn 3D image (set of wand tip positions).

To this end, the controller 110 may take the form of a computer (e.g., a personal computer or PC, a workstation, a server, or nearly any other computing device with associated input/output devices) along with memory and software (such as an operating system and modules for performing the processes and functions described herein to provide the 3D drawing experience). The controller 110 includes one or more processors or CPUs 112 that manages memory (such as memory 145, 177, video stores 131, 138, and wand trajectory store 164) of the controller 110 and runs one or more software modules or programs (e.g., code configured to cause the computer/controller 110 to perform certain functions). The controller 110 includes input/output (I/O) devices 114 such as a monitor, a touch screen, a keyboard, a mouse, and the like for displaying a user interface to an operator and for receiving input commands or instructions from an operator (e.g., to capture an image of an artist, to select and display a 3D background image, to insert the artist's captured image into the 3D background image and initiate a drawing phase, and to end the drawing phases and/or initiate special effects).

As an initial step or phase of operation of the 3D drawing system 100, a user or artist 105A has their 3D digital image captured as shown with box 139. To this end, the 3D drawing system 100 includes a 3D image capture assembly or station 120 in which the artist or user 105A is typically positioned upon a positioning device or prop 122. For example, the 3D experience may involve the artist 105A drawing or creating a 3D horse, bike, or motorized vehicle for themselves, and the positioning prop 122 may be shaped, sized, and/or configured to place the artist 105A in a position similar to what they would take in this missing object (e.g., leaning forward to ride a motorcycle, sitting with their back straight to ride a horse, sitting with their arms out to a steering wheel to drive a car, and so on). The prop 122 often will only be a partial assembly or replica of the 3D object the artist 105A later will draw or create so as to allow a desired portion of the artist 105A to be filmed or be digitally captured (e.g., only a car seat with a steering wheel rather than a body and door that may block too much of the artist's body).

The image capture assembly 120 is adapted to capture a 3D image. In the illustrated embodiment, the artist/user 105A has their image captured in 3D by the use of a two-camera stereo arrangement with a left camera 126 capturing left eye images 127 (which are communicated to the controller 110 for processing) and with a right camera 128 capturing right eye images 129 (which are also communicated to the controller 110 for processing). For example, the cameras 126, 128 may be cameras (such as web cameras, digital cameras, or the like) that have their lenses spaced apart a distance similar to human eyes (an interocular distance in the range of 1.5 to 2.5 inches or the like) to define a relative parallax differential between the left and right eye images 127, 129 (or amount of stereo effect) when they are later simultaneously displayed or projected on the projection surface 191 of the 3D projection screen 190. In other embodiments, the 3D image may be captured by the assembly 120 in other ways. For example, a depth camera, such as the Kinect™ from Sony Corporation, may be used to generate a 3D depth map of the user 105A so that the captured image of the user 105A may be fully embedded by the controller 110 in 3D in the scene provide on projection surface 191 (or virtually in the drawing space in front of the projection surface 191).

To make the drawing experience more entertaining for the artist/user 105A, the 3D digital image is first removed or "keyed" out of their background scene. For example, the positioning prop 122 and background features captured by cameras 126, 128 may be "keyed" out. As shown, the left image 127 is provided to the controller 110 for processing by a chromakey module 130 while the right image 129 is provided to the controller 110 for processing by a chromakey module 132, and the resulting images 131, 133 are stored or buffered in video stores 136, 138 for later use by the controller 110.

More particularly, the controller 110 may use keying techniques implemented by the modules 130, 132 such as chromakey compositing to process the images 127, 129. To facilitate the chromakeying, a mono-colored background (such as blue or green (as shown for modules 130, 132)) may be provided behind the user 105A and prop 122 in the image capture assembly 120, and this mono-colored background may be evenly lit. The chromakey modules 130, 132 may apply a chromakey/luma key function to separate and remove the background in the keyed images 131, 133.

Lighting (not shown in FIG. 1) is typically also used in the image capture assembly 120 to more brightly light portions of interest of the user/artist 105A (e.g., those features that are to be embedded in the 3D image projected on 3D projection screen 190 such as one side of their body and their head or face). In such cases, the keying modules 130, 132 may provide luma keying to "key" out the user's 3D image from the background. The user/artist 105A is lit brightly (e.g., is the brightest thing seen by the cameras 126, 128 in the darkened room), but the background and all other objects (including the prop 122) are black or dark and are illuminated far less than the artist/user 105A.

The keying function is typically done simultaneously by the controller 110 with the keying modules 130, 132 processing separate signals 127, 129 from the two side-by-side stereo cameras 126, 128. The resulting images or signals 131, 133 are provided to video stores (or video peak stores or frame buffers) 136, 138 for at least temporary storage prior to their being provided/communicated 152, 156 to video mixers 143, 144 and then to left and right projectors 150, 154.

As a second or later stage of operation, the artist/user will be immersed in a 3D drawing space in which they can interact and receive real time feedback with a projected 3D image (or 3D world/environment). To this end, the 3D drawing system 100 includes stereo projectors in the form of a left projector 150 and a right projector 154, and the projectors 150, 154 are selectively operated by the controller 110 to project left and right eye images 151, 155 onto a projection surface 191 of a 3D projection screen 190. The left and right eye images 151, 155 are typically differently polarized for separate viewing by left and right eyes of a viewer (such as an artist/user 105C wearing 3D glasses (e.g., glasses with a left lens that allows viewing of the left images 151 and a right lens that allows viewing of the right images 155)). The projection surface 191 typically is adapted to be a polarization retaining screen/surface such as may be provided with a silver screen (or silver lenticular screen) or the like.

Initially (or pre-drawing operations), the controller 110 may operate via left/right splitter module 140 to provide left and background image streams 141, 142 to the video mixers 143, 144 feeding left and right projectors 150, 154. The background images may be retrieved by module 140 (or processor 112) from memory or store 145, and these may be still or video images such as point in time or time period from a movie (e.g., a still image, a moving video image, or any combination thereof) to allow an artist/user 105C to be inserted into a familiar and interesting background (e.g., have their image displayed in a 3D world from a movie).

The stereo or 3D background image 151, 155 may be continuously displayed on the main projector screen 190 by the left and right stereo projectors 150, 154. In one embodiment, the projectors 150, 154 are made "stereo" or 3D projectors by providing polarizing films 158, 159 (which may be applied over the lenses of projectors 150, 154) and by using a surface 191 that is a silver screen or other surface that maintains light polarization upon reflection (and reduces reflection loss to counter inherent losses by polarization via films 158, 159). For example, the polarizing film 158 may act as a vertical or horizontal polarizer while film 159 acts as a horizontal (or vertical) polarizer so that the images 151, 155 may be viewed separately by the artist/user 105C through their 3D glasses 166. During this pre-drawing stage, the artist 105C, wearing 3D/stereo glasses 166 moves to the display/drawing area in front of the large screen surface 191 (e.g., a back wall of a room or the like), and the artist 105C is given a sense of a large vista that they will eventually become a part of during the drawing or immersion stage of operation for the drawing system 110. In some typical embodiments, the image capture assembly or "taking area" 120 is separated at least some distance from the drawing area or space in front of the 3D projection screen 190, and the artist/user 105A starts their drawing experience in or by operation of the image capture assembly or station 120.

As a third or second pre-drawing stage of the operation of the drawing system 100, the controller 110 operates to provide the keyed version of the image 152, 156 of the artist 105A to the video mixers 143, 144 with the background images 141, 142. The keyed left and right eye images 152, 156 are mixed with the background images 141, 142 such that they are also projected 151, 155 onto the projection surface 161. In other words, the images 152, 156 are keyed in so that they blend with the 3D perspective of the background images being projected 151, 155 by the left and right projectors 150, 154 such that the artist 105C sees a 3D image of themselves within the 3D background world or environment.

A special 3D effects module 170 may be provided for use by the controller 110 in making the insertion or keying in of the artist's 3D images 152, 156 more dramatic or visually exciting. For example, the effects module 170 may function to cause the artist's 3D images 152, 156 to appear to be "beamed" into the 3D background images 151, 155 by appearing gradually as occurs in many science fiction movies. To this end, a special effect may be triggered by the processor 112 via effects module 170 (e.g., in response to an operator operating a GUI 114 (e.g., pressing a button or the like) to insert the artist's images 152, 156 into the drawing space). Such triggering may occur while the keyed version 152, 156 of the artist 105A (one view from each of the two stereo cameras 126, 128) is applied to the output mixer 143, 144 driving the left and right image projectors 150, 154. The image of the artist 105A may be dramatically keyed in such as with a shimmering visual effect so that the images 152, 156 blend with the 3D background image (a portion of which is keyed out or replaced by the artist's left and right eye images).

The 3D drawing system 100 may also include a sound effects module 176 that may operate to play background music 177 via operation of the loudspeakers 178 positioned in or near the drawing space in front of projection screen 190. The background music 177 may, for example, be songs from the movie associated with the background images 145. Additionally, the 3D effects module 170 may trigger 173 the sound effects module 176 to provide a sound or music when it is performing 3D visual effects. For example, a transporter or beaming device sound effect may be provided over loudspeakers 178 while the artist's 3D images are being keyed into the background images 141, 142 for projection in the mixed left and right images 151, 155 by stereo projectors 150, 154.

In one embodiment, the projected 3D image of the artist shows the artist in a proper position to be supported on or operating some object such as a motorized or flying vehicle but with the object missing (e.g., the prop 122 was keyed out or removed from the image 127, 129). In such embodiments, the "task" of the artist 105C in the drawing experience is to draw or create the 3D object in the projected images 151, 155 (e.g., draw the motorcycle, horse, dolphin, jet ski, or any other object that they will ride or interact with in the 3D world/environment).

To allow the artist/user to draw in the space in front of the screen 190, the artist/user 105B is provided a drawing instrument or "wand" that they can move in the 3D space or drawing space by the screen 190. The drawing system 100 is configured to track the 3D location of a portion of the wand 160 such as its tip and to provide the tracked positions at 165 to the 3D effects module 170 such that this set of locations can be drawn, displayed, or inserted 171 into the 3D background images 141, 142 provided to projectors 150, 154 via output mixers 143, 144.

For example, the wand 160 may include a tracking element 161 such as, but not limited to, a magnetic tracker transmitter such that a magnetic tracker receiver 162 can operate to determine the X, Y, and Z locations of the tip 161 of wand 160. The locations may be stored in a wand trajectory store 164 and then provided or fed 165 to the 3D effects module 170. In another embodiment, a second pair of stereo cameras may view the tip 161 (which may be lighted) and its position could be determined (triangulated) over time. The tracking may be performed magnetically, optically, electrostatically, or using any other known or to be developed position tracking techniques.

In other words, the tracker receiver 162 determines the 3D location of the tip and stores these positions over time in the trajectory store 164. In one implementation, the tracker receiver 162 and transmitter 161 takes the form of a magnetic tracking assembly from Polhemus, and, in this case, a first coil is provided in the tip/transmitter 161 and a second coil is provided in the receiver 162 (e.g., positioned near the projectors 150, 154). The second coil of receiver 162 sends out a magnetic field and when the first coil is activated (e.g., by a button or switch on the wand 160 by the artist 105B) the first coil sends a signal that can be tracked by the receiver 162 to determine the present location of the tip 161.

The artist/user 105 then uses the wand 160 in the drawing space to draw in 3D. In practice, the artist 105 may be challenged to draw inside the projected 3D scene 151, 155 that includes them (or their image from the capture assembly 120). A goal, for example, may be to draw an object such as a vehicle that they can use to move in the 3D world or a support structure such as a bridge to prevent them from falling (e.g., the images 127, 129 may be video images of the artist 105C walking or running and the support structure may provide their path in the projected 3D environment).

The drawing system 100 through the use of the wand 160 and tracker receiver 162 is able to determine the artist's indicated drawing position in space relative to the projection screen 191 (e.g., to the projected background images and the projected 3D image of the artist that was captured by the stereo cameras 126, 128). As a result, it is possible for the artist 105C to draw around the projected 3D image. For example, the artist 105C may move the tip 161 of the wand 160 in "front" of the projected image of themselves, and the 3D effects module 170 functions to cause a colored or lighted strip (or other projected element) to be projected by the left and right projectors 150, 154 to appear in front of the 3D image of the artist. However, if the artist 105C draws a portion of the object or item behind their floating image, the portion that is further into the 3D scene or images will be occluded and not seen (not displayed in the images 151, 155 when the artist's 3D image is concurrently displayed but is stored such that it will be displayed when/if the artist's 3D image is removed from the images 151, 155 as in some special effect processes provided by module 170).

Since the 3D drawing system 100 always knows where the tip 161 of the wand 160 is in 3D space (because of continuous tracking by tracker 162), the drawing system 100 via controller 110 can operate to display a 3D cursor that floats in free space in line with the pointing direction of the wand 160. This allows the artist 105C to know where in 3D space they are drawing as they move the tip 161 through 3D drawing space. A button/switch on the wand 160 may be used to start/stop drawing (i.e., by signaling in a wired or wireless manner the controller 110 from the wand 160 to start/stop drawing, and a connection or wire(s) may also be provided so as to provide power to the wand 160).

The drawing is a locus or set of points (or 3D locations) that are stored in the wand trajectory store 164 or in other memory accessible by the controller 110. Since the stored 3D drawing includes the X, Y, and Z spatial positions of each one of the dots that make up the overall drawing, the 3D drawing can be manipulated separately from the other images such as from the 3D artist images 131, 133, which may be useful for displaying the 3D drawing without the artist's 3D image in projected light 151, 155, for performing special effects on the 3D drawing (such as to spin it out of the image or otherwise animate it).

In some embodiments, the actual motion of the wand 160 and transmitter/tip 161 are used to define the 3D drawing and its locus of 3D points/locations. In other cases, though, a scaler (a software module or routine) is provided in controller 110 to apply a scaling parameter to the tracked motion of the tip 161, which may be useful for determining relative motion but providing a larger (or smaller) 3D movement that can then mapped to virtual 3D space to provide the 3D drawing (or locus/set of 3D positions of the points/pixels of the created drawing).

The artist 105C completes the 3D drawing to end the drawing stage or phase of operation of the drawing system 100. At this point, the controller 110 may operate (such as in response to an operator's input in a GUI 114) to perform one or more special effects using the completed 3D drawing. Because the trajectory store 164 stores the 3D drawing (or 3D map of the drawing), the effects module 170 can rotate or otherwise move in 3D space the 3D drawing and/or change its size, coloring, and even shape of this set of 3D points (or "point cloud"). In one example, the 3D effects module 170 spins the drawing off 182 of the screen 161 such as by spinning the 3D drawing about a rotation point and then shrinking it in size until it disappears from view.

In some cases (e.g., to simplify processing), the controller 110 may operate to remove the artist's 3D image 152, 156 at 180 from the mixed left and right images 151, 155 prior to performing special effects on the 3D drawing. This avoids a need to generate a full 3D image of the artist/user 105A. If stereo cameras 126, 128 are used to capture the artist 105A or their image, it is straightforward to simply preserve the left and right eye views of the artist's keyed-out image 131, 133 and their horizontal disparity, which allows the left and right eye images to be placed in a specific area on the projection surface 191. The human brain will generate a 3D image of the artist/user 105A from these images 152, 156 and a detailed depth map of the person is not required. If the drawing system 100 is configured to also manipulate the artist's image in 3D space (such as to spin it in 3D rather than simply within a plane), then an image of the person from every side may be captured in the assembly 120 (e.g., a full volumetric model of the artist/user 105A).

The sound effects provided by module 176 and stored sounds/music 177 may be triggered by game or drawing experience states. These states may include when a drawing is being manipulated (e.g., a tornado sound effect stored in memory 177 may be played by module 176), when a 3D image of an artist/user is first beamed into the streams 151, 155, when a 3D image of the artist/user is second beamed out of the streams 151, 155, and so on.

In some embodiments, the 3D drawing is stored in memory 164 upon completion (e.g., before spinning off or removal from the 3D projected images 151, 155). The controller 110 may then operate to associate the completed 3D drawing with the artist (such as with an artist/user identifier). The controller 110 may then operate the I/O devices 114 to print out the 3D drawing as a left or right mono-scopic image or as a stereo image. The controller 110 also could operate the I/O devices 114 to transfer a digital copy or version of the 3D drawing to the artist/user such as by transferring the 3D drawing to a web server where it can be accessed by the artist/user using their identifier (e.g., an Internet web site may provide access to the completed 3D drawings for retrieval or other use by the artist/user). In some implementations, bar code readable cards were provided to each user/artist 105A, and each card had a unique bar code and an associated human-readable code. The user's card was scanned at some point in the drawing experience (such as upon completion of the 3D drawing) and their drawing 3D image is stored in memory with a link to the human-readable code. The artist/user then can view and download/manipulate their 3D image by going to or visiting a web site and typing in their code.

FIGS. 2-5 illustrate perspective views of one embodiment of a 3D drawing system 200 that may be used to provide an immersive 3D drawing experience. The system 200 may include components shown in the system 100 of FIG. 1, and some of these components are not described in detail with reference to FIGS. 2-5 but are understood to be used to provide the described functionality (e.g., the software/logic of the controller 110 may be provided in computer/controller 210 of system 200). The 3D drawing system 200 includes an image capture or taking station 201 and a drawing space or station 202 that are separated by a divider/wall 203, and the controller/computer system 210 may be shared by both stations 201, 202 or their components to coordinate operation of the two stations 201, 202 including use of captured 3D images of an artist/user 205A in drawing station 202.

Figure 2:
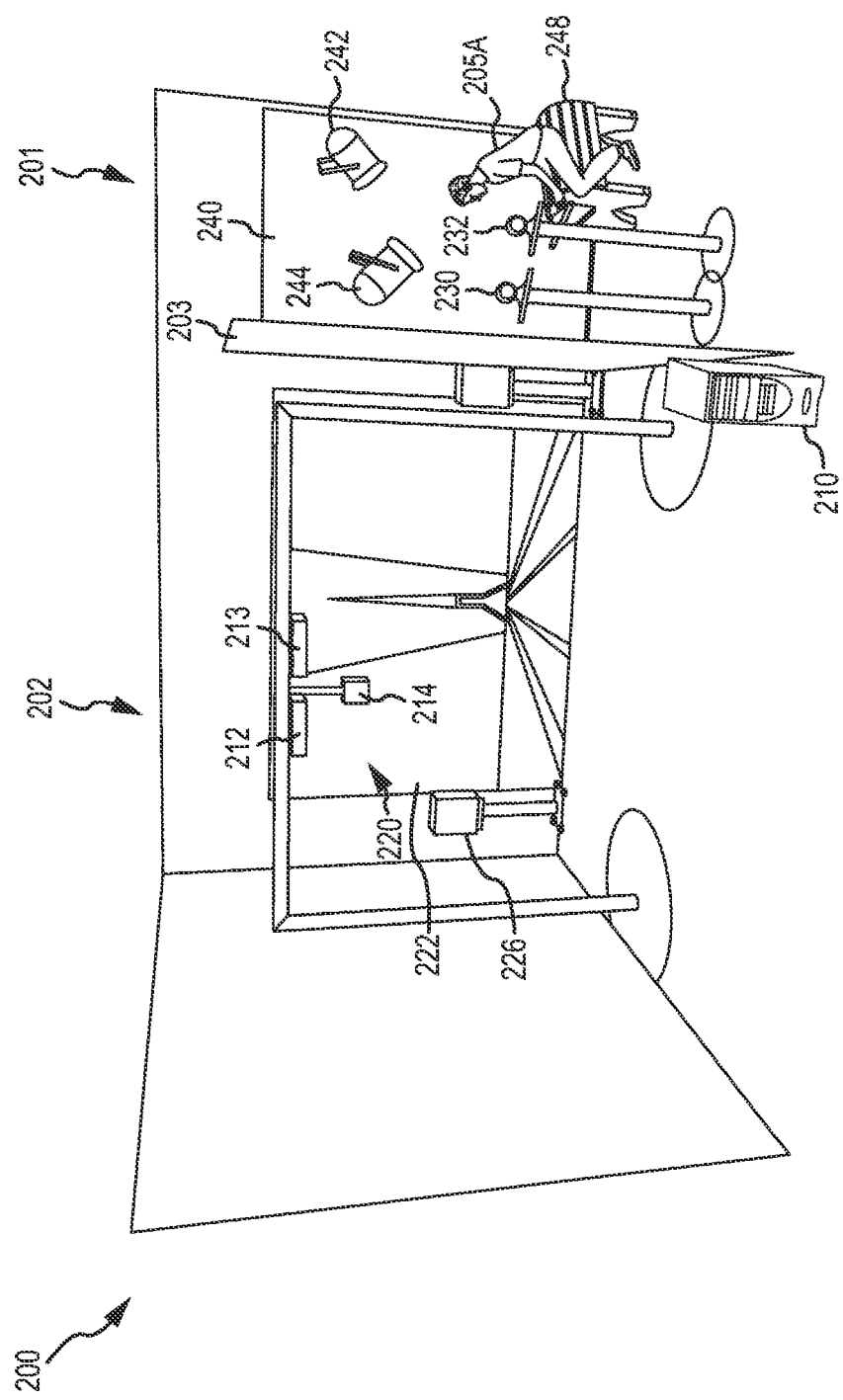
FIGS. 2-5 illustrate perspective views of a 3D drawing system during use during the capture of a 3D image of a user/artist, after the captured 3D user image has been inserted into a 3D background image on a 3D projection screen, during 3D drawing by the user/artist moving a wand or drawing instrument in 3D drawing space in front of the projection screen, and during a special effect involving removal of the previously inserted 3D user image and then spinning out of the completed 3D drawing image from the 3D background image.

FIG. 2 illustrates the drawing system 200 during an initial stage of operation in which a user 205A is having their 3D image (a still or video image) captured in image capture station 201. During image capture, the drawing station 202 may be operated in a standby mode with a blank screen or with a 3D background image displayed (as shown). The drawing station 202 includes the controller 210 that controls operation of stereo projectors 212, 213 and 3D tracking mechanism 214. The drawing station 202 further includes a polarization-maintaining screen 220 (e.g., a silver screen or the like), and the projectors 212, 213 are being operated to project a 3D background image 222 on the screen 220 such as by using left/right images retrieved from a buffer or memory of controller 210 and first and second polarizers on projectors 212, 213. The tracking mechanism 214 is in standby or non-operating mode in FIG. 2 as there is presently no drawing instrument/wand in the station 202 that needs to be tracked. In FIG. 2 (or during image capture), the controller 210 may also operate speakers 226 to play music such as a soundtrack or songs associated with the background images 222 (e.g., a song played during a movie that included the scene portrayed in images 222).

In the image capture stage shown in FIG. 2, the image capture station 201 is being operated by the controller 210 to capture a 3D image of a user 205A. To this end, the image capture station 201 includes a left stereo camera 230 and a right stereo camera 232 that provide output signals or image data to the controller 210 for processing (e.g., chromakeying, luma keying, or the like to capture and store only an image of the user 205A). The capture station 201 includes a user-positioning prop 248 upon which the user 205A sits so that the user 205A is positioned or oriented in a position desired for a particular drawing experience such as leaning forward with hands on a bar to be in a bike-riding position (as shown).

The image capture station 201 also includes a backdrop 240 that may be monochrome (such as a green or blue screen) and the prop 248 may also be colored to be monochrome (e.g., the same color as the backdrop 240). Lighting 242 may be included to provide background lighting that may be kept extremely even to facilitate keying processing of the image of the user 205A taken by cameras 230, 232. Lighting 244 may also be included to ensure that portions of the participant/user 205A are brightly illuminated (such as their sides, arms, and face) and not the background 240 and prop 248 (e.g., in the case of luma keying). With the proper lighting provided and the user 205A in a proper position on prop 248, the controller 210 may be operated, such as in response to an operator pressing a button in a GUI or the like, to cause the cameras 230, 232 to capture left and right eye images of the user 205A. As discussed above, these captured images are then processed by the controller 210 (e.g., with a keying or other image processing module or software routine) to key the user's 3D image out from the background 240 and off of prop 248. This keyed version of the 3D image of the user 205A is then stored or buffered in memory of the controller 210 for later use in drawing station 202.

Figure 3:
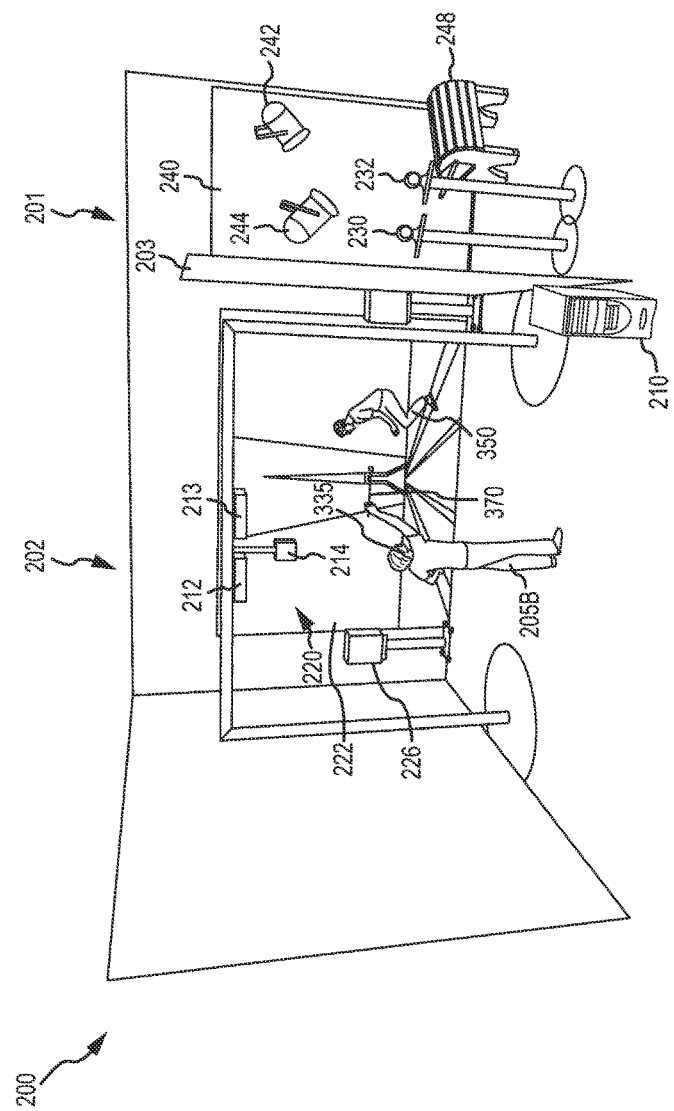

In FIG. 3, the 3D drawing system 200 is illustrated in a pre-drawing stage or mode of operation. As shown, the controller 210 is using the projectors 212, 213 to project the 3D background image 222 on screen 220, and, concurrently, it is using the projectors 212, 213 to project or display the 3D keyed version of the artist or user 205A. The image 350 may be thought of as the 3D inserted image of the user 205A that appears to the user 205B, who has donned 3D glasses 355, to be a 3D object in the 3D background 222. The image 350 appears to be floating or unsupported because the positioning prop or support 248 has been removed from the originally captured digital image of the user 205A. The user 205B has also been given a drawing instrument which the controller 210 is able to track in the 3D space in front of the screen 220, and such tracking may be done in a number of ways such as by the controller's operation of the magnetic tracker 214 (and provision of a coil on the tip of wand 370). In the operating mode shown in FIG. 3, the user 205B has not activated the wand 370 for drawing (e.g., has not pressed a "drawing ON" button/switch on the wand to start drawing).

Figure 4:
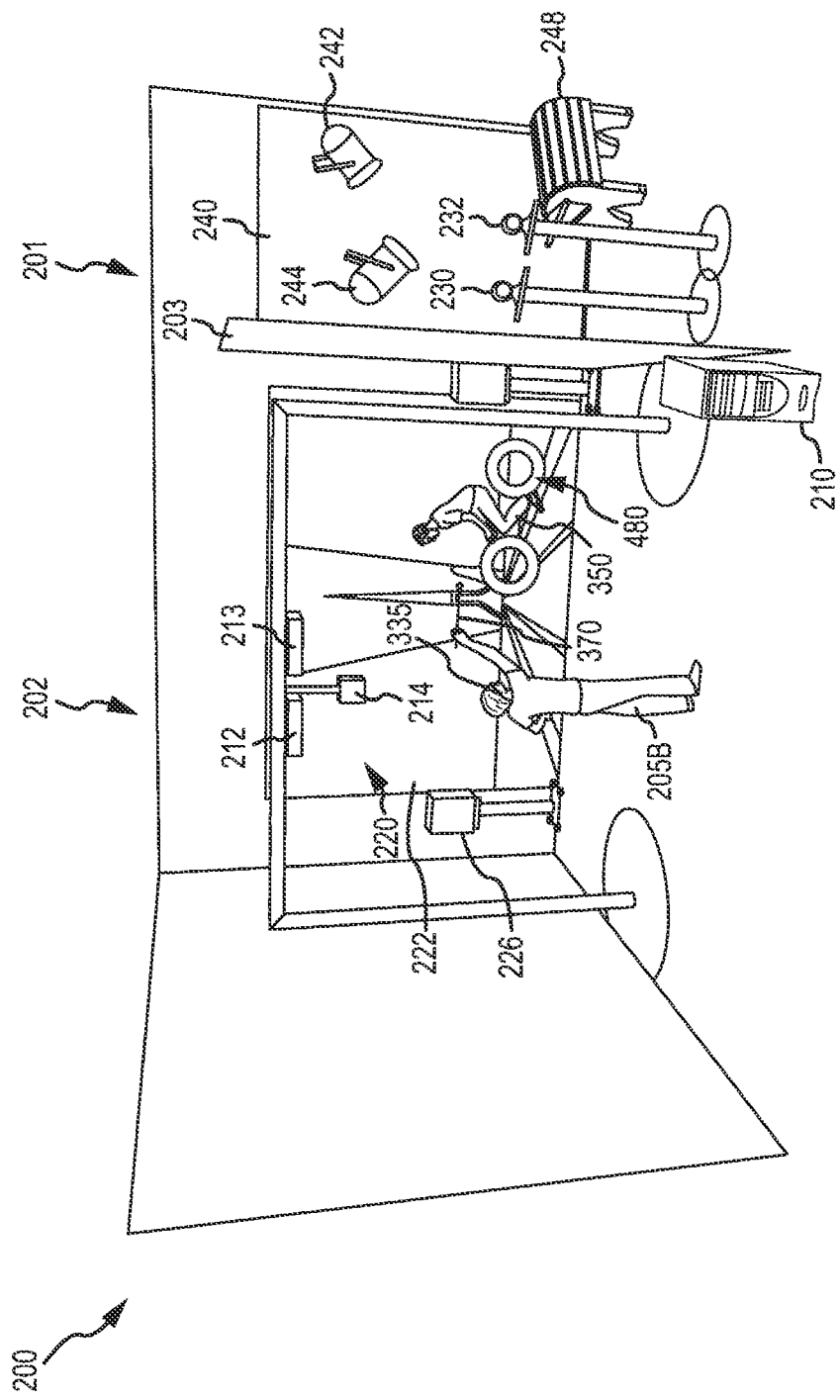

FIG. 4 illustrates the 3D drawing system 200 during a drawing step or operation. In FIG. 4, the user 205B is standing in front but below the projectors 212, 213 and tracker 214 so as to not block the projected images 222, 350 (but a rear projection set up could be used in some implementations) and so as to allow tracking of movement of the wand 370 (or its tip) in the 3D space in front of the screen 220. The user 205B has activated the wand 370 or signaled a start of drawing such as by pressing a trigger or button on the wand 370.

The controller 210 responds by operating the tracker 214 to track the set of X, Y, Z locations (or 3D positions) of the wand 370 or a tracking element in the wand 370. The controller 210 stores this locus of 3D positions as the 3D drawing. As the user 205B moves the wand 370 in the 3D drawing space, the controller 210 generates a 3D drawing image 480 that it inserts into combined image made up of the 3D background 222 and the inserted 3D user image 350. The 3D drawing image 480 includes left and right eye portions such that it has depth to the user 205B wearing the glasses 355. The 3D drawing image 480 is mapped to the 3D drawing space and presence and position of the 3D user image 350 such that the 3D drawing image 480 may be in front of the image 350 (blocking it from view), behind the image 350 (such that the image 350 blocks a portion of the image 480 from view by user 205B), or to the sides of the image 350. In this way, the 3D drawing system 200 provides the user 205B with real time feedback of the 3D drawing that they are drawing/creating by moving the wand 370 with the real time projection of the set of points 480 associated with the tracked portion of the wand 370.

Figure 5:
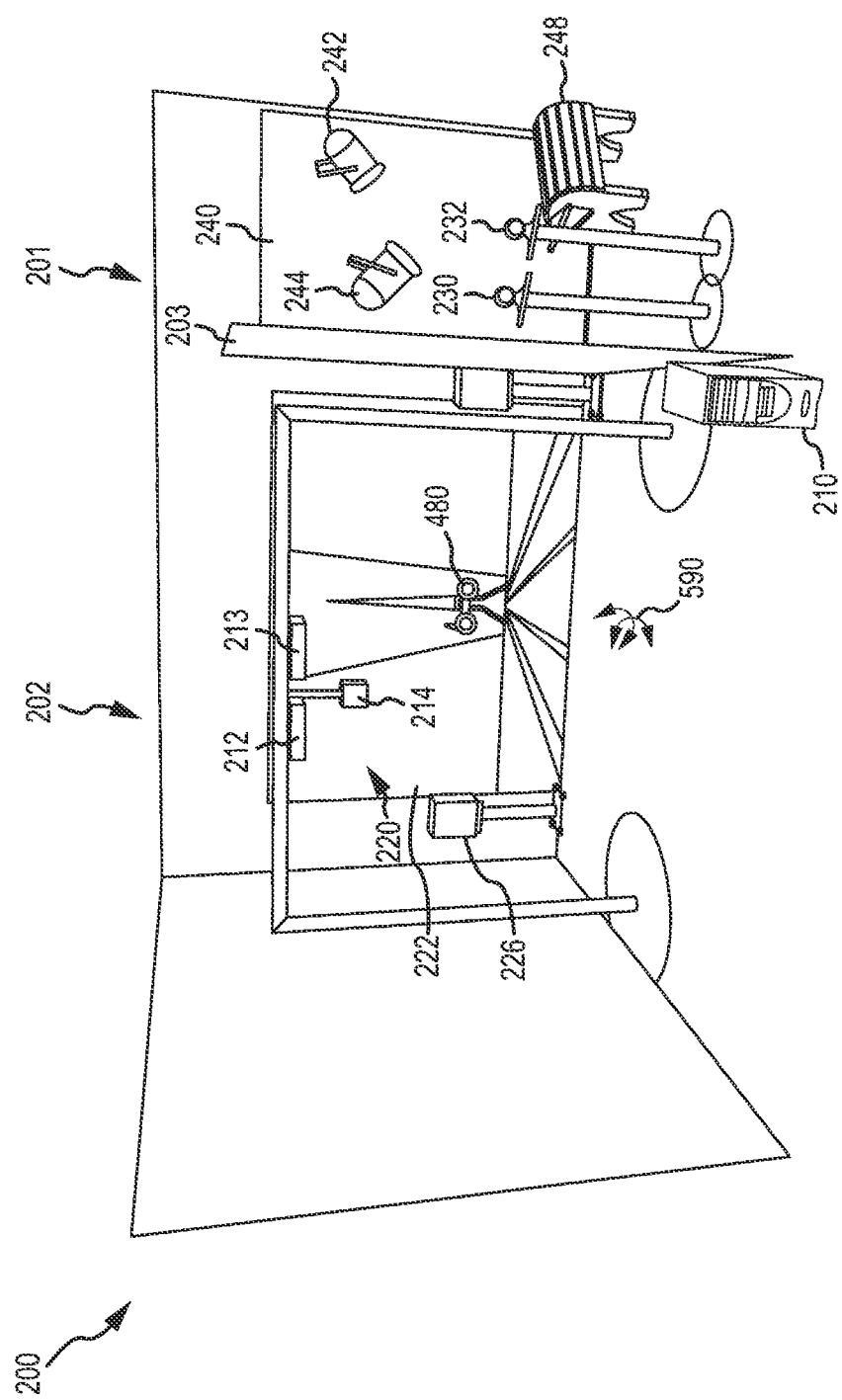

FIG. 5 illustrates the 3D drawing system 200 after the controller 210 has operated to remove the 3D user image 350, and this removal may be provided as a special effect such as by gradually beaming the user out of the 3D world provided by background image 222 with associated music/sounds played over speakers 226. After the 3D image 350 is removed, the 3D drawing image 480 is initially held in place and shown in its entirety without any portions being blocked or occluded by the 3D user image 350. Then, the controller 210 may function to provide another special effect such as by spinning the image 480 out of the 3D background 222. This effect may be accompanied by music and/or sounds on speakers 226.

The spin out effect may include rotating 590 in 3D space in one, two, or more directions (e.g., in the Y-plane, in the X-plane, and/or in the Z-plane or between such planes) so as to show the drawn 3D image 480 from one, two, or more points of view. For example, the image 480 may be viewed fully from the front as seen during drawing or be viewed from a different side such as turned to show its back side (e.g., a motorcycle facing the right originally could be rotated to face to the left or be rotated to be upside down and so on). The spin out effect may then involve changing the size of the 3D drawing image 480 such to shrink it while it is spinning until it disappears from the 3D background 222, with FIG. 5 showing the image 480 spinning 590 and reduced in size.

Figure 6:
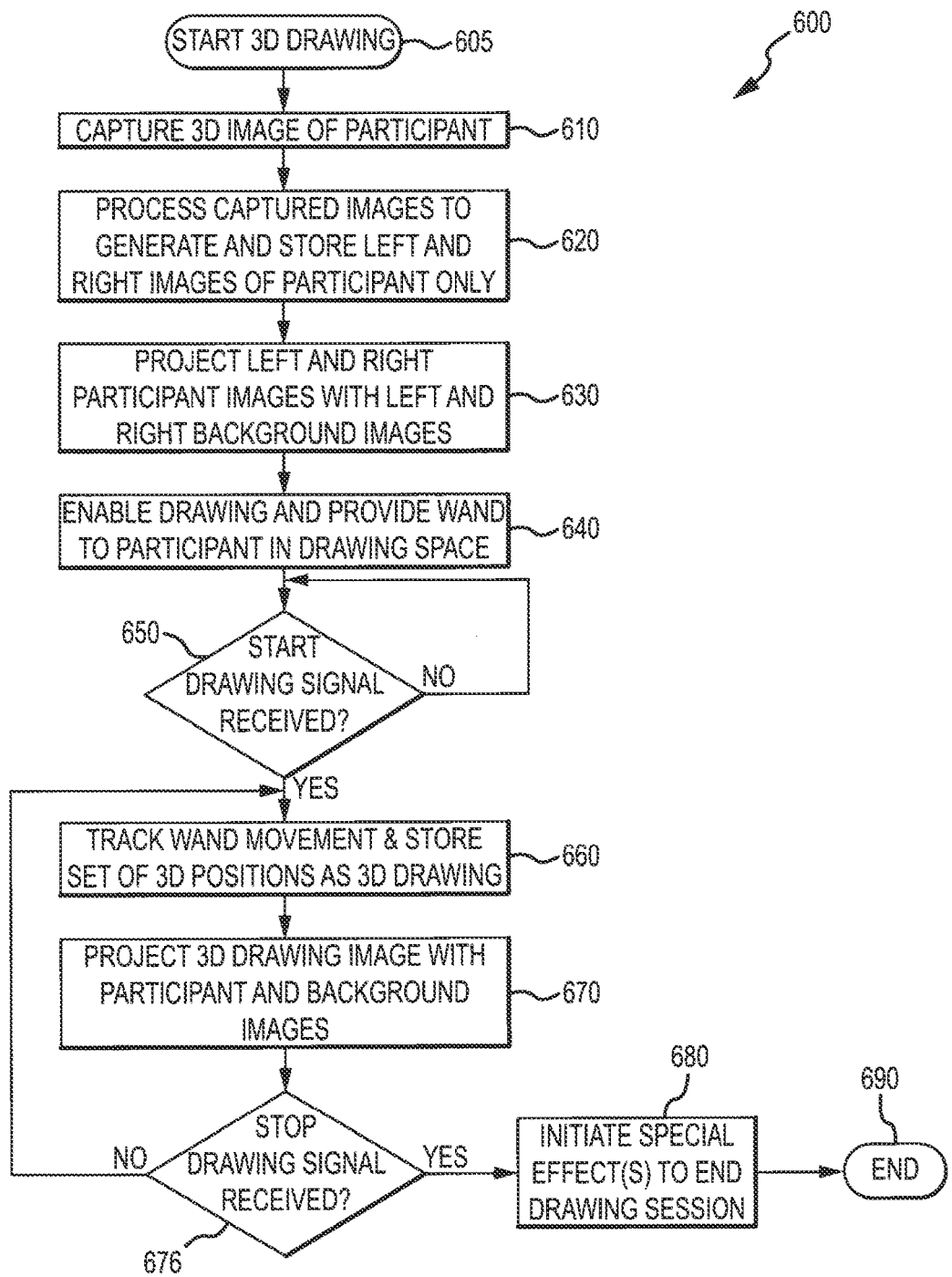
FIG. 6 is a flow diagram of a 3D drawing method such as may be implemented by operation of the systems of FIGS. 1-5.

FIG. 6 illustrates a 3D drawing method 600 such as may be performed by operation of systems 100 and 200. The method 600 starts at 605 such as with the selection of a desired 3D background (e.g., what movie scene to show or the like) and drawing challenge (what 3D object or objects should be drawn by the participant, which will drive what position they are placed for image capture? or will the drawing be more of a free style experience?). The method 600 continues at 610 with capturing a 3D image of the participant who may be placed on a positioning prop or otherwise encouraged to take a particular stance or position in front of a pair of stereo cameras. The cameras (such as 2 web cameras) are operated with the participant being lighted to provide 2 camera feeds to the controller for storage in memory for further processing.

At step 620, the method 600 includes processing the captured left and right eye images of the participant to remove the participant's image from the background. For example, luma keying or chromakeying may be used to obtain two digital images of the participant only from feeds from two side-by-side cameras having their lenses separated by the interocular distance. In step 630, the left and right keyed/processed versions of the participant images are projected with first and second (or left and right) projectors along with left and right background images.

In this manner, the 3D participant image is inserted into a 3D background, and this may involve superimposing the left and right participant images on a silver or other 3D projection screen with two image plates from a movie or other source (e.g., a still or video image as a left plate and a still or video image as a right plate). The projectors may be any of a variety of projectors with one implementation using projectors chosen to be able to project from a short distance over a fairly large screen (e.g., 8 to 15 feet away from a projection screen that may be 100 or more square feet in size). In step 630, the 3D background image may be projected first and then the 3D participant image inserted into the 3D background image to give the effect that the participant is being beamed or launched into the world (with optional accompanying noises and visual effects such as a flashing light or fading the participant's image in gradually).

In step 640, the controller of the 3D drawing system enables drawing, which may occur concurrently with insertion of the participant images into the background images. This may include providing the participant a drawing instrument or wand that is adapted to support 3D spatial tracking by a tracking receiver or mechanism in the 3D drawing system (such as via optical or magnetic motion tracking techniques). The participant is positioned with the wand proximate to the projection screen such that they are immersed into the displayed 3D world that includes their 3D image.

The method 600 continues at step 650 with the controller waiting for receipt of a start drawing signal from the participant or, more accurately/typically, from the wand when the participant presses a drawing start button/switch. If not, the method 600 continues at 650. If a signal is received at 650, the method 600 continues at 660 with operation of a tracker mechanism (such as a magnetic tracker receiver) to determine spatial locations of the wand (or a tracking/positional element in the wand such as a coil in its tip). The locus or set of these 3D positions or X, Y, and Z locations or points are stored in memory by the controller as the partially completed 3D drawing. Concurrently or nearly so, the controller acts at 670 to project the 3D drawing image (or locus of wand tip locations) onto the projection screen mapped to the 3D background image and the inserted participant images. This provides real time feedback to the drawing participant where and what they are drawing in 3D space, and the 3D drawing image may occlude portions of the background and/or participant image that it is in "front" of and the 3D drawing image may be occluded by portions of the participant image that it is "behind."

At 676, the method 600 continues with the controller monitoring for receipt of a stop drawing signal from the participant such as by pressing a stop drawing button/switch (or pressing the drawing button again) on the wand. If not received, the drawing and projecting steps 660 and 670 are repeated/continued. If a stop command is received at 676, the method 600 continues at 680 with initiating special effects to end the drawing session and then the session is ended at 690. The special effects may include removing the 3D participant image from the projected image stream such that the 3D drawing image is visible in its entirety. The 3D drawing image may then be manipulated such as through 3D rotation to allow viewing from more than a single point of view. The spinning rate may be slow to start and then increased to higher and higher rates until the image simply vanishes, and the size may be changed (e.g., shrink to a dot/point and then vanish from view). The removal of the 3D images may be provided with flashing lights, changing colors, a fade out and/or other effects.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A three dimensional (3D) drawing method for immersing a user in an interactive 3D experience, comprising:
in response to first signals from a controller, projecting a stereoscopic 3D image of the user on a projection screen;
with a position tracking mechanism, determining a set of 3D positions of a drawing instrument positionable by the user, during a drawing time period, relative to the 3D image and proximate but spaced apart from the projection screen;
storing the set of determined 3D positions in memory accessible by a controller;
with the controller, generating a 3D drawing image based on the set of determined 3D positions; and
in response to second signals from the controller, projecting a mixed stereoscopic 3D image, on the projection screen, that comprises a blending of the projected stereoscopic 3D image of the user and the 3D drawing image,
wherein the projected stereoscopic 3D image of the user comprises a first set of left and right eye images,
wherein the projected mixed stereoscopic 3D image comprises a second set of left and right eye images differing from the first set of left and right images,
wherein the projecting of the mixed stereoscopic 3D image is performed concurrently with the tracking of the 3D positions of the drawing instrument, and
wherein the 3D drawing image is processed to include left and right images mapped to the right and left eye images of the 3D image of the user, whereby portions of the 3D drawing image behind the projected stereoscopic 3D image of the user are occluded from view by the user.

2. The method of claim 1, wherein the determining of 3D positions is performed only after the controller receives a start drawing signal from the drawing instrument and is terminated after the controller receives a stop drawing signal from the drawing instrument, whereby the user selectively starts and stops 3D drawing with the drawing instrument.

3. The method of claim 1, further comprising capturing the 3D image of the user and wherein the projected stereoscopic 3D image of the user is mixed with a 3D background image.

4. The method of claim 3, wherein the capturing of the 3D image of the user includes capturing a left eye image with a first camera and a right eye image with a second camera spaced apart from the first camera by an interocular distance and further includes processing the left and right eye images to key out an image of the user from background images.

5. The method of claim 1, further including after the projecting of the mixed stereoscopic 3D image, modifying the mixed stereoscopic 3D image to remove the projected stereoscopic 3D image of the user, whereby a completed version of a 3D drawing is projected on the projection screen.

6. The method of claim 5, further including after the modifying of the mixed stereoscopic 3D image, animating the 3D drawing image on the projection screen including rotating the 3D drawing image on the projection screen to modify a point of view for the user, whereby the 3D drawing image is rotated in 3D space.

7. A 3D drawing method, comprising:
projecting a 3D background image, comprising left and right eye images providing a first stereo effect, on a projection screen;
tracking spatial movement of a portion of drawing element moved by a user located proximate to the projection screen, the tracking including determining a locus of 3D positions of the drawing element portion relative to the projection screen;
generating a 3D drawing image from the locus of 3D positions;
mixing the 3D drawing image with the 3D background image to create a mixed 3D image; and
at least partially concurrently with the tracking of the spatial movement of the drawing element portion, projecting the mixed 3D image, comprising left and right images providing a second stereo effect, on the projection screen.

8. The method of claim 7, wherein the mixed 3D image further includes a 3D image of the user.

9. The method of claim 8, wherein the 3D image of the user comprises left and right eye images captured by stereo cameras and processed by luma keying or chroma keying to isolate an image of the user from background portions of the captured images and wherein the 3D image of the user is added to the mixed 3D image prior to addition of the 3D drawing image.

10. The method of claim 7, further comprising 3D rotating of the 3D drawing image within the mixed 3D image.

11. The method of claim 7, further including:
associating the user with the mixed 3D image and with a token including a human-readable code;
associating the mixed 3D image with the token;
storing a digital copy of the mixed 3D image in a data storage device linked to a communications network; and
providing access to the digital copy of the mixed 3D image in response to receiving a request over the communications network including the human-readable code.

12. The method of claim 11, wherein the providing access step includes distributing the mixed 3D image or portions thereof as at least one of a left or a right mono-scopic image or as a stereo image.

13. A 3D drawing system for providing a participant with an immersive experience with real time feedback, comprising:
an image capture assembly operating to capture 3D images of the participant;
a controller accessing memory to retrieve 3D background images;
a video mixer operated by the controller to mix the 3D participant images and the 3D background images to form mixed 3D images;
a projection screen;
a 3D projection assembly projecting the mixed 3D images, including left and right eye images providing a first stereo effect, on the projection screen;
a spatial tracking mechanism determining a locus of 3D positions relative to the projection screen; and
a 3D drawing module operated by the controller to generate a 3D drawing image from the locus of 3D positions, wherein the controller further operates the video mixer to modify the mixed 3D images to include the 3D drawing image to provide a second stereo effect with the projection assembly including the 3D drawing image being concurrently displayed with the 3D images of the participant in a 3D space in front of the projection screen and wherein the 3D drawing image includes left and right images mapped to the 3D image of the user, whereby portions of the 3D drawing image behind the 3D image of the user in the mixed 3D images projected by the 3D projection assembly are occluded from view by the user.

14. The system of claim 13, wherein the spatial tracking mechanism includes a wand with a magnetic tracker transmitter and a magnetic tracker receiver operating to gather the locus of 3D positions defining spatial positions of the magnetic tracker transmitter during its use by the participant.

15. The system of claim 13, wherein at least a subset of the locus of 3D positions are mapped to 3D positions between a 3D location of a portion of the 3D participant images and the projection screen, whereby a portion of the 3D drawing image associated with the subset of the 3D positions is blocked from view by the participant by the 3D participant images.

16. The system of claim 13, further comprising a special effects module operable by the controller to selectively fade the 3D participant images in and out of the mixed 3D images projected on the projection screen.

17. The system of claim 13, further comprising a special effects module operable by the controller to selectively move the 3D drawing image in 3D space in the mixed 3D image and selectively remove the 3D drawing image from the mixed 3D image.

18. The system of claim 13, wherein the image capture assembly comprises left and right cameras positioned side-by-side and spaced apart an interocular distance, wherein the 3D participant images include left and right eye images from the left and right cameras, wherein the controller processes the left and right eye images to key an image of the participant out from background image features, wherein the 3D projection assembly includes one or two projectors projecting the keyed left eye images and the keyed right eye images, and wherein the mixed 3D images include left and right eye images from the 3D background images associated with the keyed left and right eye images.

* * * * *